Dec. 31, 1963   J. B. LEIBEE   3,115,921
TIRE CONSTRUCTION
Filed Aug. 8, 1960   2 Sheets-Sheet 1

United States Patent Office 3,115,921
Patented Dec. 31, 1963

3,115,921
TIRE CONSTRUCTION
Joseph B. Leibee, Wilmington, Del., assignor to E. I. du Pont de Nemours and Company, Wilmington, Del., a corporation of Delaware
Filed Aug. 8, 1960, Ser. No. 48,320
5 Claims. (Cl. 152—361)

This invention relates generally to pneumatic tires and, more particularly, to a belted tire construction in which the belt and the cords therein are highly extensible.

A conventional tire carcass is reinforced with a plurality of layers or plies of fabric having parallel cords which extend from bead to bead and are anchored by passing around the beads. The cords generally extend diagonally across the crown of the tire at angles of 30 degrees to 50 degrees relative to the mid-circumferential plane with the cords of any one ply intersecting those in the adjacent plies. These carcass plies supply the primary reinforcement against all distortion whether it be circumferential, radial or lateral. Since the cords are symmetrically placed, all perform approximately the same function. Such a construction may also be provided with one or two breaker strips which have fewer cords per inch and are not anchored except by the surrounding rubber. The latter are often called "shock pads" to indicate their function. Tires of this conventional construction will be referred to hereinafter as diagonal ply tires.

A less common type of tire is based on an entirely different arrangement of the reinforcement materials. The carcass plies are reduced in number and have the individual cords crossing over the crown from bead to bead in directions nearly parallel to radial planes. Instead of the breaker strips, an inextensible band or belt having a plurality of cord plies of high modulus materials is provided. The belt cords lie nearly parallel to the mid-circumferential plane. A somewhat wider angle with this plane has been proposed when the belt cords are of wire. This type of construction is referred to hereinafter as a belted tire.

In known belted tire constructions, the cord directions of the carcass plies and the belt plies differ by large angles approaching 90 degrees. The primary function of the carcass reinforcement is to resist air pressure in the tire whereas the inextensible belt functions to resist circumferential and lateral as well as radial stresses. For these tires, it has been claimed that scuffing of the tread on the road is avoided and that the tires show much better tread wear than those of the diagonal ply construction. At the same time, it has been recognized that such tires give a bumpy ride since the inextensible belt does not permit any substantial envelopment of road irregularities. An objectionable feel has also been noted in steering which factor is probably due to the radial placement of the carcass cords in the side walls.

A rather serious disadvantage of diagonal ply tires reinforced with nylon throughout is their tendency to form "flat spots." When a vehicle on which such tires are mounted stands idle for some time, that portion of the tire in the neighborhood of the footprint is distorted in to from a flat area which persists after the vehicle is in motion and, for a short time, results in an objectionable, bumpy ride. Since this phenomenon occurs to a far lesser degree in tires reinforced with higher modulus cords, it is believed to be due to the distortion of the low modulus nylon cords in the footprint area. Although considerable time and effort have been expended in various attempts to remove the flat spot tendency, it remains a deterrent to the use of nylon cords in passenger car tires. In this respect, the provision of additional or heavier plies of nylon is neither economically nor technically feasible. This route only tends to stiffen the tire so that more heat is developed as the tire is flexed which, in turn, causes higher internal temperatures and a more rapid deterioration of the cord.

The most important object of the present invention is to provide a belted tire construction having good tread life as well as soft and comfortable ride characteristics.

A corollary objective is the provision of a belted tire construction in which an extensible material is used in both the carcass and belt reinforcements.

A specific object of the invention is to provide a belted tire construction in which the belt, per se, is circumferentially extensible and in which the bounce or jolt resulting from a flat spot is reduced to an entirely acceptable level.

With these and other objectives in view, the tire construction of the present invention is provided with an arrangement of reinforcement materials which includes at least two carcass plies extending from bead to bead in the tire. Each carcass ply comprises a layer of parallelized low modulus nylon cords located in generally radial planes. In addition, the reinforcement arrangement includes four or more belt or tread plies, each comprising a layer of the same type cords used in the carcass plies. The individual nylon cords of the several belt plies each lie in a plane generally parallel to the mid-circumferential plane of the tire.

Further objectives and advantages will become apparent in the following specification wherein reference is made to the accompanying drawings in which.

In belted tires, either high or low modulus cords may be used in the carcass plies, depending upon the details of the construction. However, the use of an inextensible material in the belt plies has been previously accepted as essential. One well-known commercial tire of this type uses steel wires or cables in the belt section to insure constant circumferential length. Another type utilizes large quantities of high tenacity, high modulus rayon in the belt section.

Figure 1:
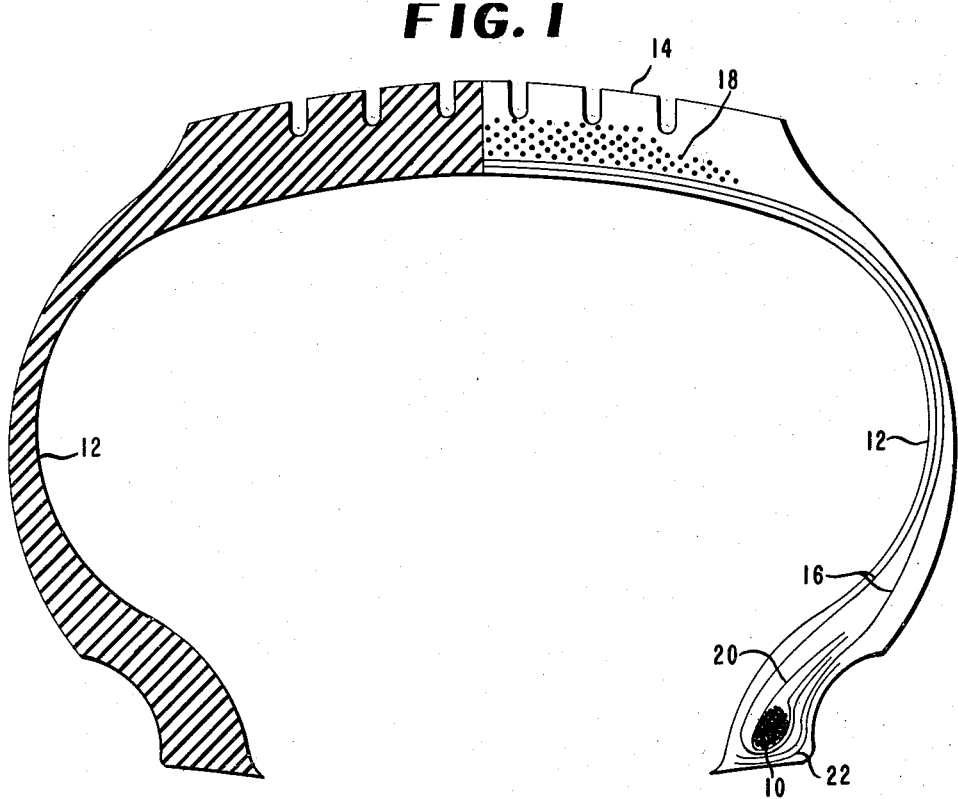
FIGURE 1 is a half cross-sectional and half schematic illustration of the tire construction of the present invention.
Figure 2:
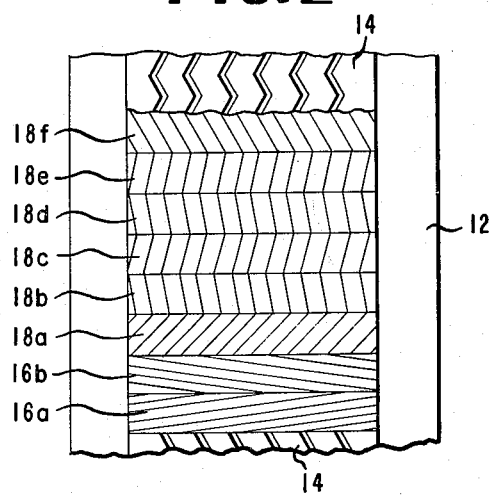
FIG. 2 is a fragmentary peripheral view of the tire shown in FIG. 1, portions of the tread and carcass having been removed to reveal (schematically) the manner in which the cords of the various plies are placed.

The embodiment of the present invention which is illustrated in FIGS. 1 and 2 includes a pair of beads 10, a pair of side wall portions 12, and a tread portion 14. This construction is reinforced by two carcass plies 16, a plurality of belt plies 18, a flipper strip 20, and a chafer strip 22. Carcass plies 16 extend from bead to bead in the tire whereas the individual belt plies 18 extend substantially throughout the width of tread portion 14. The manner in which the carcass plies 16 cooperate with the beads 10, and the strips 20, 22 is conventional and may be modified as desired. The belt plies 18 have widths varying from a maximum for the innermost ply 18a to a minimum for the outermost ply 18f. As shown in FIG. 2, the individual cords of the carcass plies 16a, 16b lie at small angles to radial planes of the tire. Those of belt plies 18b–e lie at a small angle to the mid-circumferential plane and the cords of 18a, 18f are at a larger angle to the mid-circumferential plane of the tire.

Figure 3:
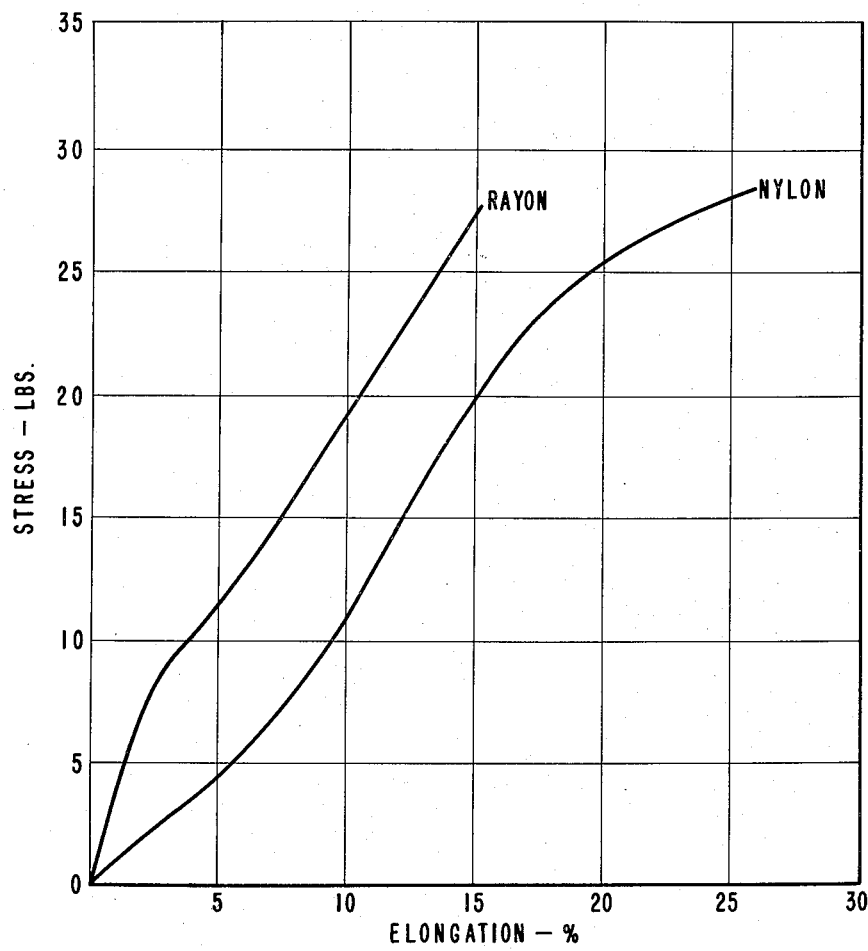
FIG. 3 is a graph showing the stress-elongation curves for conventional rayon and nylon tire cords.

The curves shown in FIG. 3 were obtained by plotting the stress and elongation values of 1650 denier, two-ply rayon and 840 denier, two-ply nylon cords, both having been pre-treated and otherwise prepared in the same manner for incorporation into tires. In view of the diffences in properties, the lighter denier nylon is usually considered to be the equivalent of the heavier 1650 denier rayon cord for use in tire constructions. As shown in FIGURE 3, the two cords have about the same breaking stress of 28 pounds. But the elongation of the nylon cord is much greater over the whole range of stress. This is particularly true in the stress range of three to five pounds, i.e., in the range of normal tire service. In this range, the nylon cord has about three times the elongation of the rayon cord. This factor has an important bearing on the "spring rate" of the tire, as will be explained more fully hereinafter.

In the example and the various tables and comparisons which follow, the tire sizes are uniform (8.50 x 14). Where commercial tires of that size were not available, other sizes have been analyzed and used as the basis for building a test tire, i.e., the reinforcement material of the available tire has been maintained in both kind and arrangement. Where reference is made to the tires of the present invention, they were built substantially in accordance with the exemplified procedure.

EXAMPLE

Nylon yarn (hexamethylene adipamide) of 840 denier is twisted to 13 turns per inch of Z twist and two lengths of the twisted yarn are plied together with 13 turns per inch of S twist to produce a two-ply card which is treated with an aqueous adhesive solution comprising a resorcinol formaldehyde resin and an elastomer latex. It is then dried in an air oven at 240° F. for three minutes and stretched to a net stretch of 10% in a second air oven at 425° F. for 42 seconds. The cord has a breaking strength of about 28 pounds and an ultimate breaking elongation of about 25% (FIG. 3). This cord is made into a sheet having 32 parallel cords per inch. A section of this sheet is rubberized using a conventional tire carcass rubber stock of the type generally referred to as low modulus skim and having a 200% elongation modulus of about 300 pounds per square inch. This section is used in the carcass plies. A second section of the sheet is rubberized with a rubber stock of the type generally referred to as high modulus skim and having a 200% elongation of 1200 pounds per square inch. The latter section is used in the circumferential belt. The carcass sheet is cut at a bias of four degrees into layers or plies and two crossed plies are placed on a tire-building drum which has been fitted with wire reinforced beads in a conventional manner. The carcass is then expanded to approximate the desired shape of the tire and fitted to an internal form. The second sheet is cut in narrower strips approximating the width of the tread, using a cutting angle of 55 degrees for some and 85 degrees for other strips. Six strips or plies are placed over the expanded carcass, the innermost and outermost plies having a cutting angle of 55 degrees and the four intermediate plies having been cut at an angle of 85 degrees. The cord directions in each ply cross those of the adjacent plies. As shown in FIG. 1, the belt plies increase in width from the tread toward the carcass and the width of the innermost ply 18a approaches that of the tread portion 14. A tread of high-grade, wear-resistant, elastomer stock, e.g., a styrene butadiene rubber composition, is placed over the belt and side wall stock is added. The tire is placed in a low profile mold which is shaped to give the ratio of internal height to internal width of about 0.65 and then cured with heat and pressure.

In forming the belt section, a plurality of plies are used, the width of the plies being substantially that of the tread. The cord directions in all the plies need not be identical but in the major portion (plies 18b–18e) of the belt, the cord directions should lie at a small angle of less than 20 degrees to the mid-circumferential plane of the tire. In a minor portion (plies 18a, 18f) of the belt, the cord direction may lie at angles as high as 40 degrees to the mid-circumferential plane. In the carcass plies, the cord directions lie at small angles not greater than 15 degrees to radial planes passing through the axis of rotation of the tire. It is preferred in both the carcass and the belt that the cord direction in any ply intersect that of cords in adjacent plies.

The tires of this invention have substantial advantages over diagonal ply tires reinforced with nylon in that they provide greatly increased tread life, greatly reduced "flat spot" bounce, and softer ride characteristics at little or no increase in materials cost and without sacrificing the high resistance to rupture and fatigue of high elongation nylon cords. Compared to known belted tires, those of this invention have a lighter and more flexible belt, leading to easier envelopment of road irregularities and small obstacles. Tread life is substantially greater than that of diagonal ply tires.

The data given in Table I show that in commercial practice substantially more steel and/or rayon is used in conventional diagonal ply and belted tires than in those in which nylon has been employed and that the tires of the present invention require slightly less nylon by weight than a conventional nylon diagonal ply construction. Considering the cost of nylon and the advantages attributable to the belted construction disclosed herein, this characteristic is of great significance.

Table I
8.50 x 14 UNIFORM DESIGN TIRES

| Tire Type | Reinforcing Material | | Reinforcement, Wt., lbs./tire | | |
|---|---|---|---|---|---|
| | Carcass | Belt | Carcass | Belt | Total |
| Diagonal Ply | Rayon | | 2.21 | | 2.21 |
| Belted | do | Rayon | 1.20 | 1.75 | 2.95 |
| Do | do | Steel wire | 1.20 | 1.77 | 2.97 |
| Diagonal Ply | Nylon | | 1.50 | | 1.50 |
| Belted (Example) | do | Nylon | 0.61 | 0.85 | 1.46 |

In an actual test, a tire similar to that described in the example was built in the same mold, utilizing the same carcass cords, elastomer compound and tread. The belt plies, however, were made from cabled nylon cords having an 840 denier/3/2 construction with seven turns per inch in the ply and seven turns per inch in the cable. Such cables had a breaking elongation of 19.5%. Each belt ply had 20 ends per inch and was rubberized with an elastomer compound having a 200% elongation modulus of 1,000 pounds per square inch. This tire contained 1.24 pounds of nylon in the belt and a total of 1.90 pounds of nylon as against the 1.46 pounds contained in the nylon belted tire of the example. When tested for tread life in the manner to be described in connection with Table II, it showed no advantage over the belted tire of the example. It is apparent, therefore, that any increase in the amount of nylon cord in the belt merely increases the cost without any improvement in performance. Actually, such an increase in belt weight stiffens the tire and has an adverse effect on the "spring rate" as well as on the capability of the tire to envelop road irregularities.

The comparative data given in Table II were obtained in further tests and show the improvements in tread wear, "spring rate" and "flat spot" bounce which have been accomplished by following the teachings of the present invention.

To determine relative tread wear, the test tire and a control tire were mounted in comparable positions on the wheels of different motor vehicles, the wheel loading and inflation pressures being equal. The vehicles were operated over a standard course at a standard speed of 45 miles per hour throughout 8,000 miles. The height of the tread above the tread grooves was measured initially and at regular intervals during the test. The tread wear ratings given in Table II are expressed in terms of miles travelled per one mil reduction of tread thickness.

One way of indicating the softness of the tire construction is by its "spring rate". This was measured by mounting a tire on a rim and axle, inflating the tire to its rated pressure, and pressing the tire against a flat surface until the axle carried its rated load. The amount of additional loading required to produce further deflection in the tire is expressed in pounds per inch as a measure of the "spring rate".

"Flat spot" bounce is a measure of the degree of bounce produced in a running tire-wheel-axle assembly by a flat spot. A mounted and inflated tire was heated to 190° F. and pressed against a flat surface at its rated axle loading for two hours, i.e., for a time sufficient to permit cooling to room temperature. It was then placed against a test wheel, again at its rated loading and operated at a standard speed of 35 miles per hour. An accelerometer was mounted on the axle and measured the vertical acceleration caused by the flat spot. This value is expressed in Table II in terms of "G", the universal gravitational acceleration constant.

*Table II*

8.50 x 14 UNIFORM DESIGN TIRES

| Tire Type | Tread Wear, Miles/Mil | Spring Rate, Lbs./in. | Flat Spot Bounce |
|---|---|---|---|
| Belted (Example) | 118 | 1,220 | 2.0 "G" |
| Diagonal Ply Nylon Reinforced | 64 | 1,630 | 5.0 "G" |

For the purpose of determining the effect of tire profile performance, another tire was built which was in all respects identical to that of the example, except that the curing mold was shaped to give a high cross-sectional profile having an internal height substantially equal to the internal width. When tested as described in connection with Table II, this tire showed a tread life of 92 miles per mil of tread wear. By comparison with the values noted in Table II, the effect of the low profile configuration of the tire of the example is apparent. Still another tire was built which was identical to that of the example except that the elastomer stock used in the belt section had a 200% elongation modulus of 300 pounds per square inch. This tire showed a tread life of 76 miles per mil of tread wear which is superior to the diagonal ply tire of Table II but distinctly inferior to the nylon belted tire.

It is well known that the elongation properties of nylon cords may be controlled to some extent according to the number and size of yarns in the cord, the amount of twist applied, and the amount of stretch and the temperature and time used in pretreating the cords. In this respect, there is no absolute requirement that the cords in the belt be identical in all respects to those in the carcass. Any variations in cord structure and treatment which do not damage the cords in other important properties may be used, provided that there is no reduction in the ultimate elongation beneath the prescribed values. By preference, the cords should have an ultimate elongation of between 19% and 26%.

Previously, the use of an inextensible material in the belt plies of a belted tire has been accepted as essential. The comparative data given in Table III show that, in addition to the extensibility of the individual cords, each belt ply is extensible. In this respect, it is noted that the extension behavior of the nylon belted tire of the example is more similar to that of the diagonal ply tire than to those having substantially inextensible belts, i.e., its circumferential extensibility is much higher. These data were obtained by mounting the tires, inflating to 30 p.s.i. pressure, measuring the circumferences and then further inflating the tires until their circumferences were increased by 1%. The added increment of pressure required is a measure of resistance to extension of the belt.

*Table III*

8.50 x 14 UNIFORM DESIGN TIRES

| Belt | Carcass | Pressure Increment for 1% Extension, lbs./in.² |
|---|---|---|
| Wire | Rayon | >250 |
| Rayon | do | 26 |
| Nylon | Nylon | 11 |
| Diagonal Ply | do | 6.7 |

In addition to the hexamethylene adipamide nylon, other nylons including polycaproamide, other aliphatic nylons formed from two or more amide forming compounds having the same or differing numbers of carbon atoms and with or without substituent side groups, and polymers having aromatic rings in the primary chain are suitable. Here again, the principal requirement is that the cords have an ultimate elongation in excess of 19%.

The basic elastomers useful in practicing this invention include natural and synthetic rubbers. Representative synthetic rubbers are the "butadiene polymers" made by polymerizing butadiene alone or with one or more copolymerizable ethylenic unsaturated compounds such as styrene, vinyl pyridine, acrylonitrile. Other suitable synthetic rubbers include polymers of chloroprene and copolymers of chloroprene with unsaturated monomers. The elastomeric compounds used in tires will contain additives such as vulcanizing agents, accelerators, softeners, carbon blacks, pigments, antioxidants and others. The proper selection of these materials and methods of compounding to achieve desired properties in the cured compounds, such as the elongation modulus, are well known.

The desired cross-section profile of the tires of this invention is that having a flattened tread and undertread form and an internal tire height measured radially from the level of the heel of the bead to the inside of the crown substantially less than the extreme internal width. This is accomplished by choosing the size and shape of the mold used in the final shaping and curing of the tire so that the tire has the preferred shape when uninflated or when inflated to a low pressure of less than 5 pounds. The ratio of the tire height to tire width measured as described may be as low as 0.5 and as high as 1.0 and still show some of the advantages recorded in Table II. By preference, this ratio should be between 0.55 and 0.75.

It is apparent that many changes and modifications may be made in the disclosed belted tire construction as well as in the exemplary procedures without departing from the spirit of the present invention which, therefore, is intended to be limited only by the scope of the appended claims.

I claim:

1. In a belted tire construction which includes a pair of beads as well as tread and sidewall portions, a reinforcement arrangement comprising: at least two plies of carcass reinforcement extending from bead to bead in the tire, each carcass ply including a plurality of twisted, parallelized, low modulus nylon cords lying at angles of less than 15° relative to radial planes and less than 30° relative to the cords of the other carcass ply; and at least six superimposed and extensible belt plies in said tread portion, each including a plurality of twisted, parallelized, low modulus nylon cords embedded in a high modulus elastomer stock having a 200% elongation modulus of about 1200 p.s.i., said belt ply cords having an elongation at the break of about 25%, the cords in the inner and outer belt plies lying at angles of less than 40° relative to the mid-circumferential plane, the cords of the intermediate belt plies lying at angles of less than 20° relative to the mid-circumferential plane.

2. In a low profile belted tire construction including a pair of beads and elastomeric side wall and tread portions, a reinforcement arrangement comprising: two or more superimposed carcass plies extending from bead to bead in the tire, each carcass ply including a layer of parallelized low modulus nylon cords located in generally radial planes and embedded in a low modulus elastomer stock having a 200% elongation modulus of less than 500 p.s.i.; and four or more superimposed and extensible belt plies, each including a layer of parallelized low modulus, highly extensible nylon cords embedded in a high modulus elastomer stock having a 200% elongation modulus in excess of 900 p.s.i., the cords of at least four of the belt plies being disposed in substantial parallelism with the mid-circumferential plane of the tire.

3. The tire construction of claim 2 wherein the individual cords of all plies have an ultimate breaking elongation of at least 19.5%.

4. The tire construction of claim 3 wherein the cords of said four belt plies are equally angularly displaced from said mid-circumferential plane with the angular displacements not exceeding 20° and wherein the cords in one belt ply are in an intersecting or criss-crossed relationship with those of the adjacent plies.

5. The tire construction of claim 3 wherein the said carcass cords are displaced from radial planes by an angle not exceeding 15°.

References Cited in the file of this patent
UNITED STATES PATENTS

| | | |
|---|---|---|
| 2,317,911 | Hoff | Apr. 27, 1943 |
| 2,498,859 | Lessig | Feb. 28, 1950 |
| 2,930,425 | Lugli et al. | Mar. 29, 1960 |

FOREIGN PATENTS

| | | |
|---|---|---|
| 770,315 | Great Britain | Mar. 20, 1957 |
| 1,145,600 | France | May 6, 1957 |
| 1,148,638 | France | June 24, 1957 |